US012329261B2

(12) United States Patent
Ohn

(10) Patent No.: US 12,329,261 B2
(45) Date of Patent: Jun. 17, 2025

(54) COSMETIC CONTAINER FOR POWDER HAVING PUMPING STRUCTURE

(71) Applicant: WORLD SPONGE MANUFACTURING CO., LTD., Incheon (KR)

(72) Inventor: Sungdae Ohn, Incheon (KR)

(73) Assignee: WORLD SPONGE MANUFACTURING CO., LTD., Incheon (KR)

( * ) Notice: Subject to any disclaimer, the term of this patent is extended or adjusted under 35 U.S.C. 154(b) by 669 days.

(21) Appl. No.: 17/058,719

(22) PCT Filed: Apr. 8, 2020

(86) PCT No.: PCT/KR2020/004720
§ 371 (c)(1),
(2) Date: Nov. 25, 2020

(87) PCT Pub. No.: WO2021/112341
PCT Pub. Date: Jun. 10, 2021

(65) Prior Publication Data
US 2022/0287431 A1 Sep. 15, 2022

(30) Foreign Application Priority Data
Dec. 3, 2019 (KR) ........................ 20-2019-0159200

(51) Int. Cl.
*A45D 33/02* (2006.01)
*B05B 11/10* (2023.01)
*A45D 33/06* (2006.01)

(52) U.S. Cl.
CPC ........ *A45D 33/025* (2013.01); *B05B 11/1028* (2023.01); *B05B 11/1032* (2023.01); *A45D 33/06* (2013.01)

(58) Field of Classification Search
CPC ...... A45D 33/025; A45D 33/06; A45D 33/02; B05B 11/1028; B05B 11/1087; B05B 11/026; B05B 11/1032; B05B 11/1033
(Continued)

(56) References Cited

U.S. PATENT DOCUMENTS 10,478,842 B2 * 11/2019 Kang ..................... B65D 43/22
2007/0048070 A1 3/2007 Byun

FOREIGN PATENT DOCUMENTS

CN 204838419 12/2015
FR 3100994 A1 * 3/2021 ......... B05B 11/3033
(Continued)

OTHER PUBLICATIONS

JPO, Office Action of Application No. 2020-556241, dated Mar. 1, 2022.
(Continued)

*Primary Examiner* — Tatiana L Nobrega
(74) *Attorney, Agent, or Firm* — LEX IP MEISTER, PLLC

(57) ABSTRACT

The present invention provides a cosmetic container for powder having a pumping structure, the cosmetic container including: an accommodation portion (100) configured to accommodate a powder material; a lower support portion (200) disposed over the accommodation portion (100), and configured to allow air to be introduced such that the powder material accommodated in the accommodation portion (100) is discharged together with the introduced air; an air pumping portion (300) disposed over the lower support portion (200), and configured to pump air so that the air is introduced into the lower support portion (200); an intermediate support portion (400) disposed over the air pumping portion (300), and configured to discharge a powder material together with air and to collect the remaining powder
(Continued)

material; and a powder discharge portion (500) spaced apart upward from the intermediate support portion (400), and configured to allow the discharged powder material to be collected.

12 Claims, 13 Drawing Sheets

(58) Field of Classification Search
USPC .......................................................... 222/405
See application file for complete search history.

(56) References Cited

FOREIGN PATENT DOCUMENTS

| | | | | | |
|---|---|---|---|---|---|
| JP | S63-179907 | | | 11/1988 | |
| JP | 5229989 | | | 7/2013 | |
| JP | 2019080856 | A | * | 5/2019 | ............. A45D 33/00 |
| KR | 10-0602426 | | | 7/2006 | |
| KR | 10-2011-0033857 | | | 3/2011 | |
| KR | 10-1171305 | | | 8/2012 | |
| KR | 10-1529424 | | | 6/2015 | |
| KR | 10-1529424 | B1 | * | 6/2015 | ........... A45D 33/003 |
| KR | 20160000238 | U | * | 1/2016 | ............. A45D 40/00 |

OTHER PUBLICATIONS

KIPO, International Search Report of Application No. PCT/KR2020/004720, Aug. 28, 2020.

* cited by examiner

【Fig. 1】
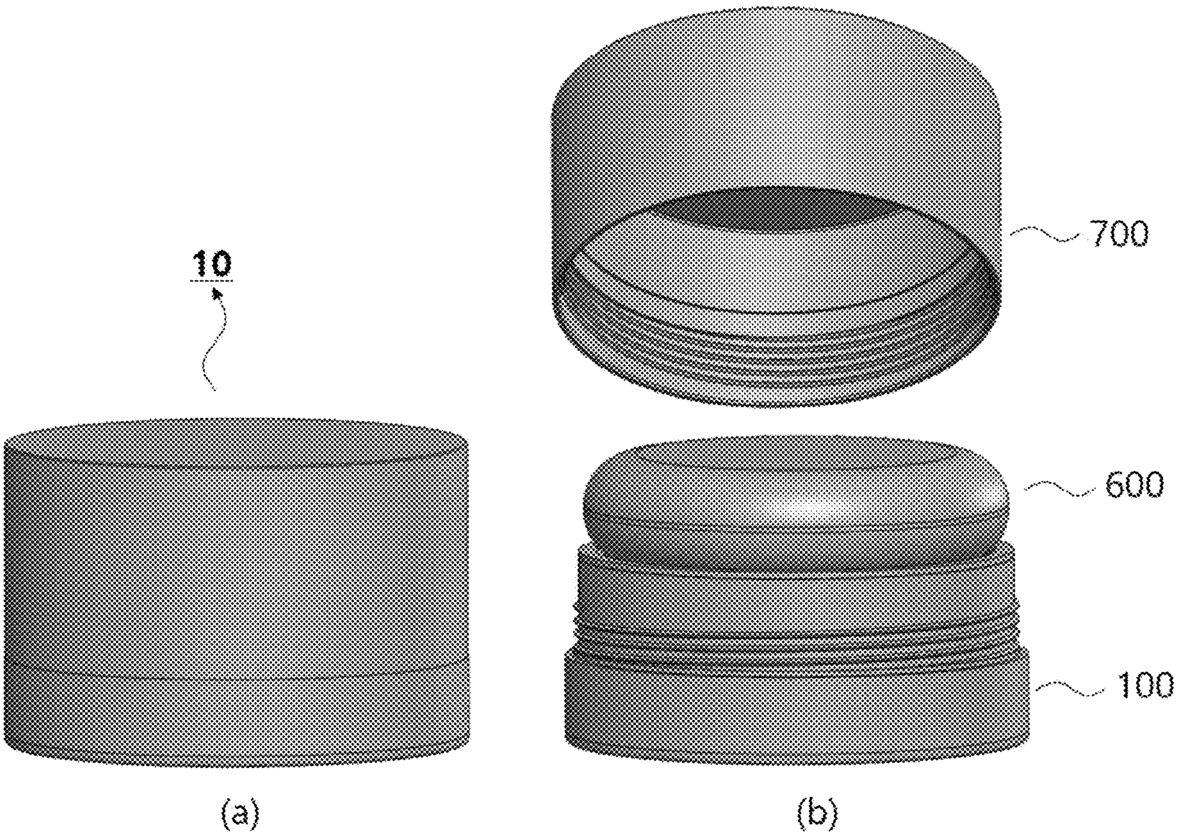

【Fig. 2】
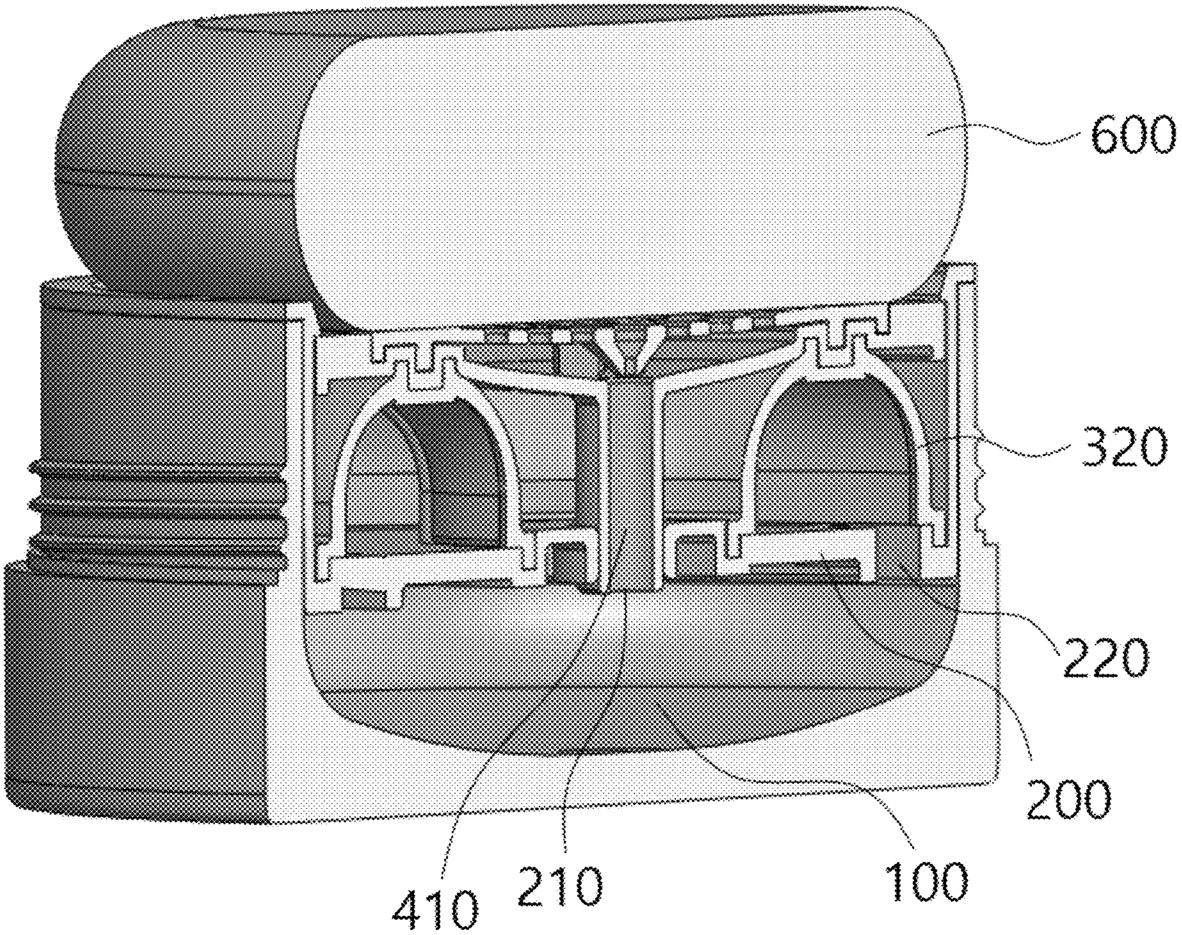

【Fig. 3】
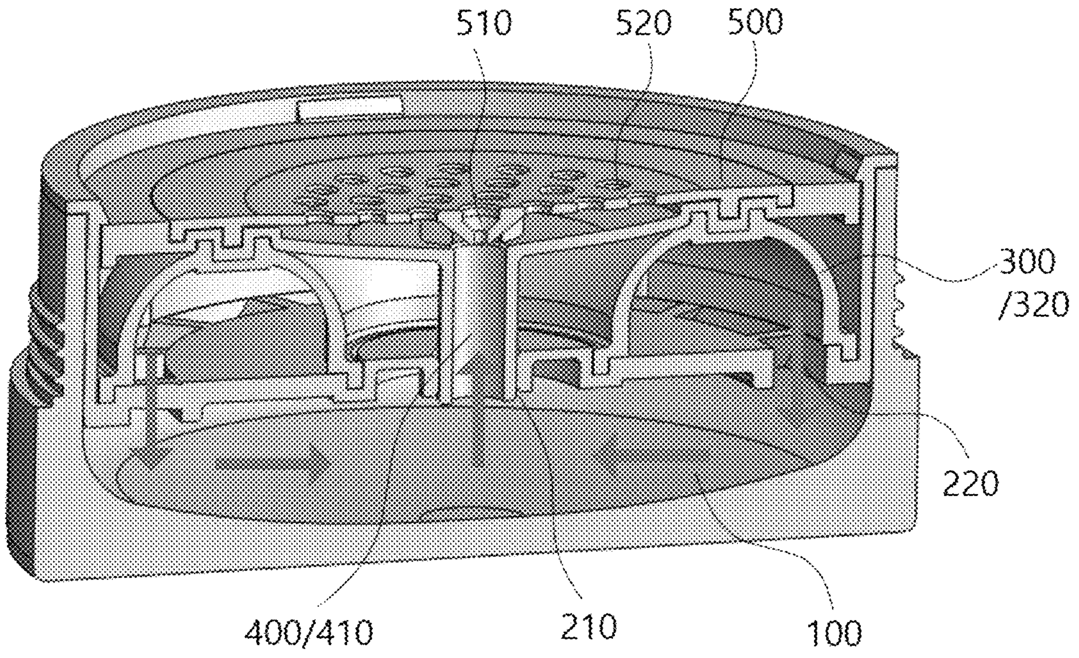

【Fig. 4】
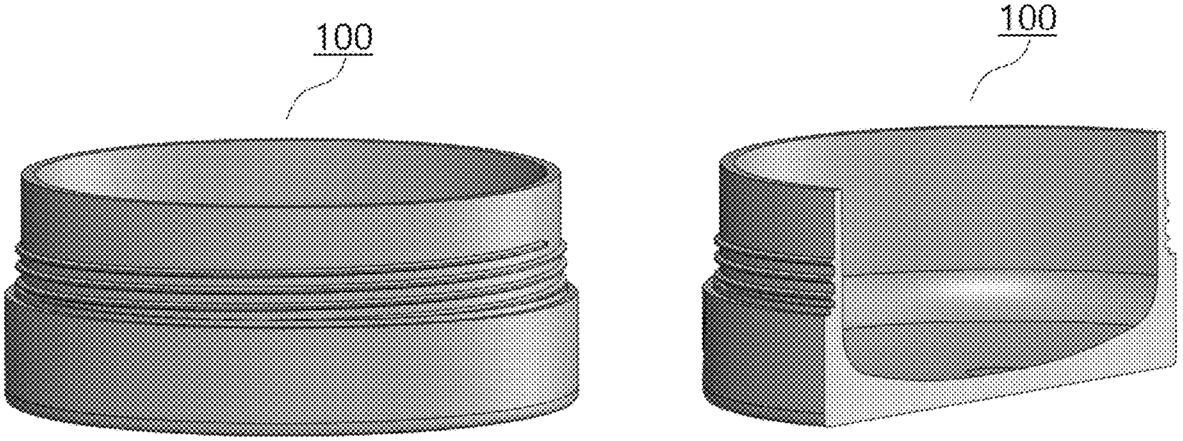
(a) (b)

【Fig. 5】
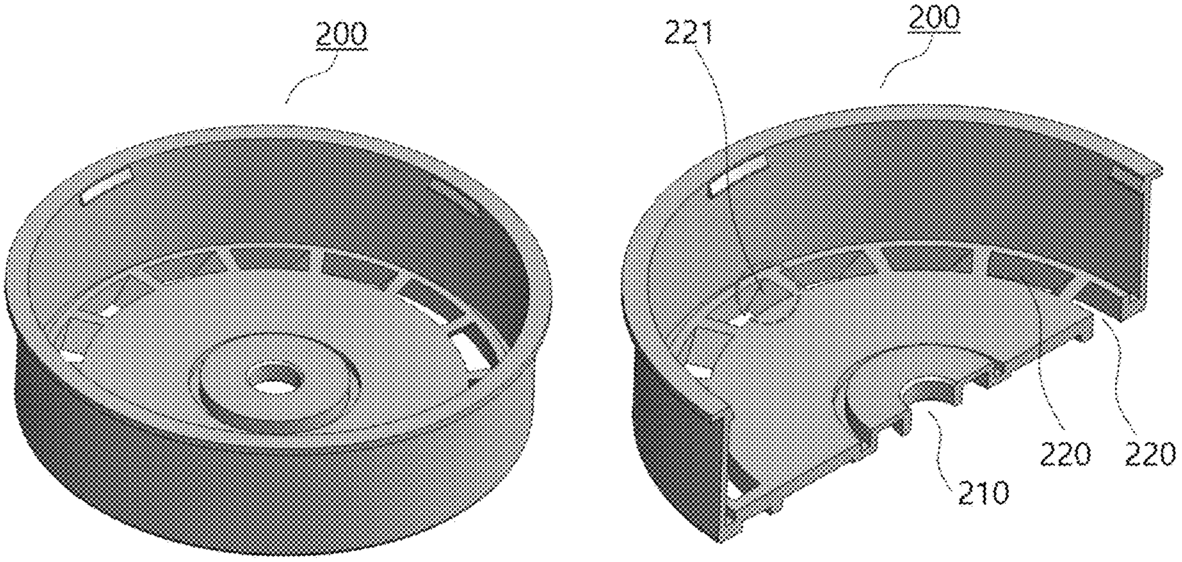
(a) (b)

【Fig. 6】
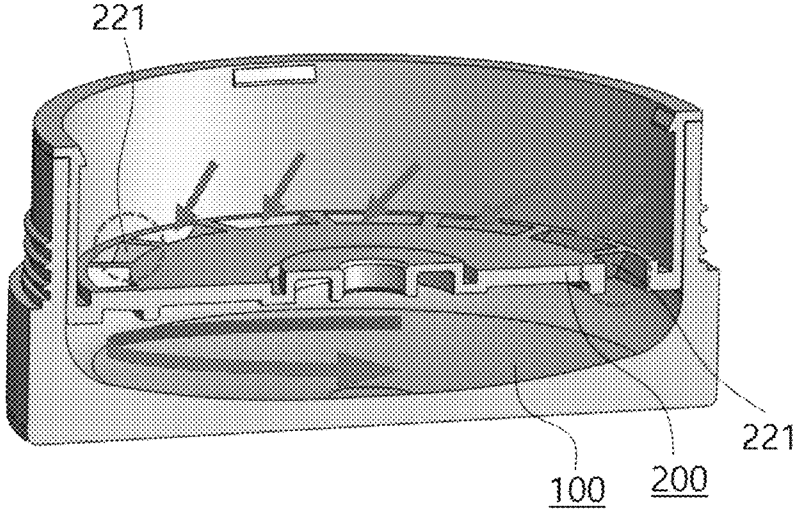

【Fig. 7】
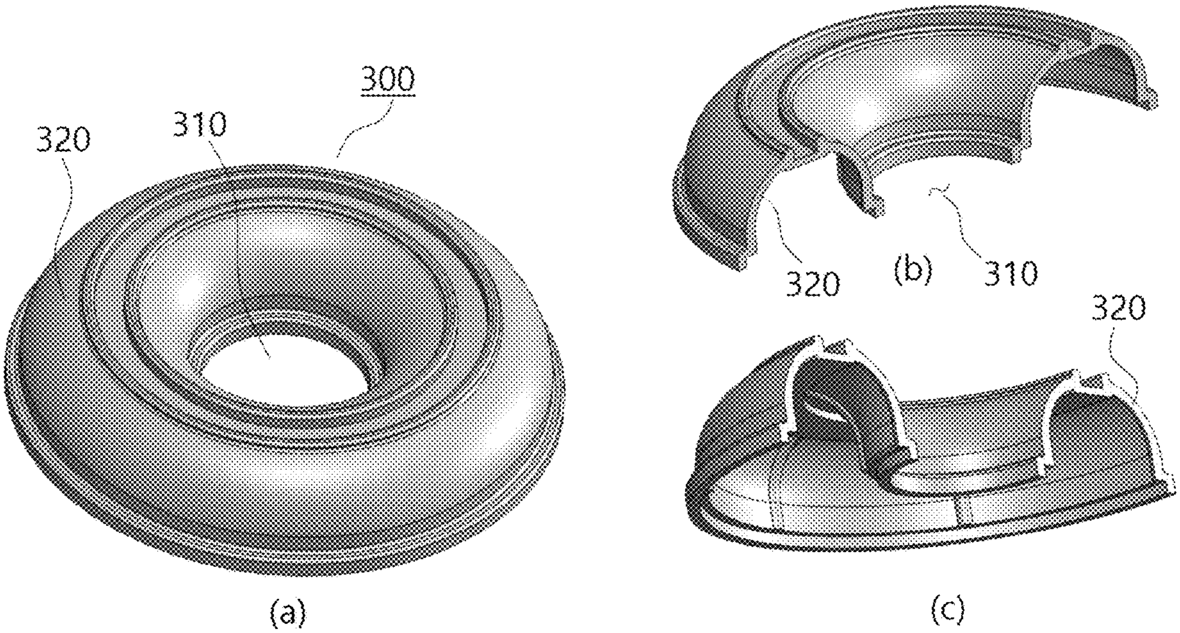

【Fig. 8】
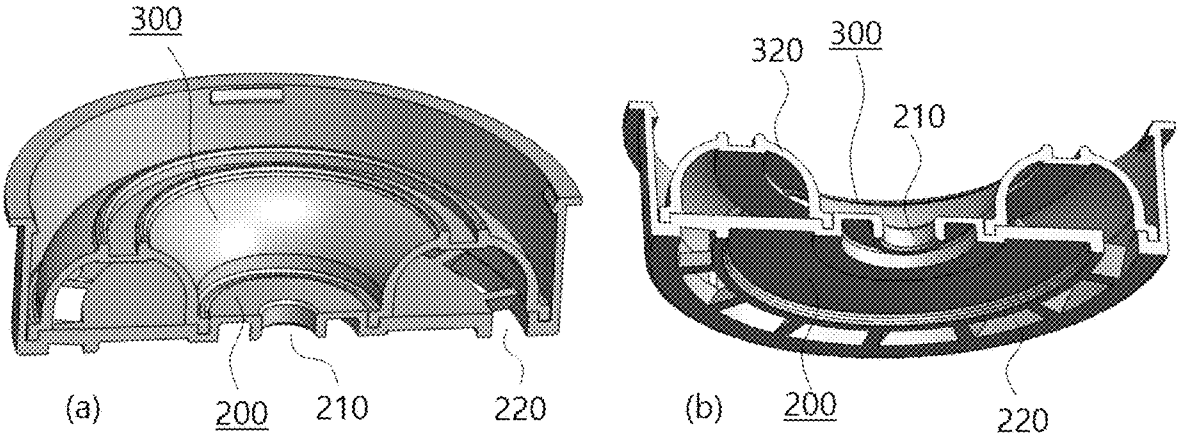

【Fig. 9】
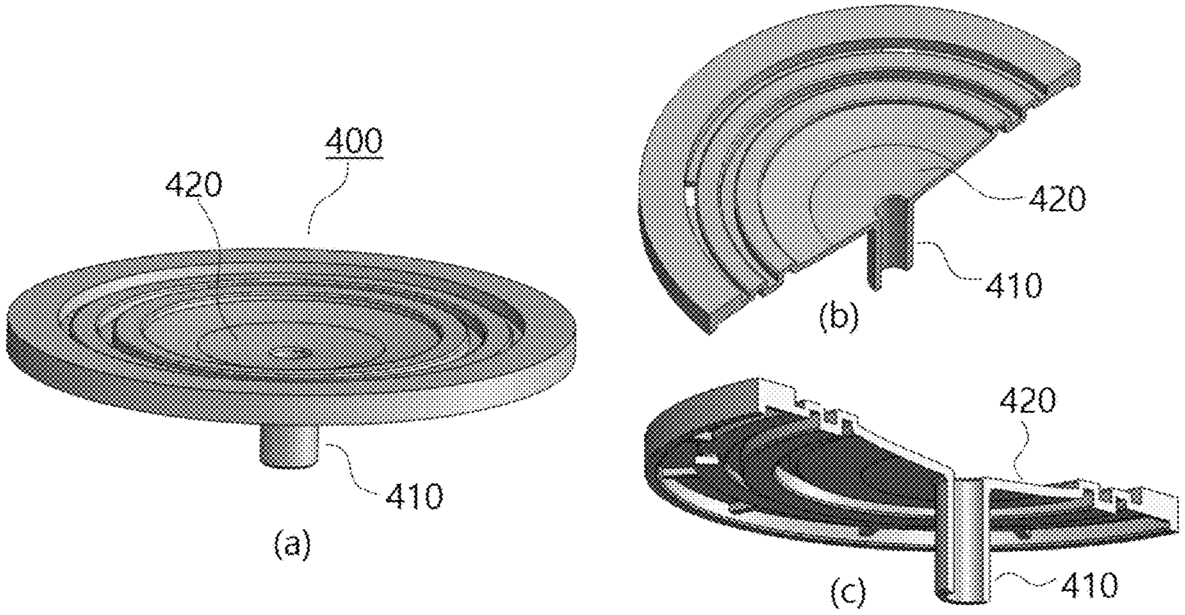

【Fig. 10】
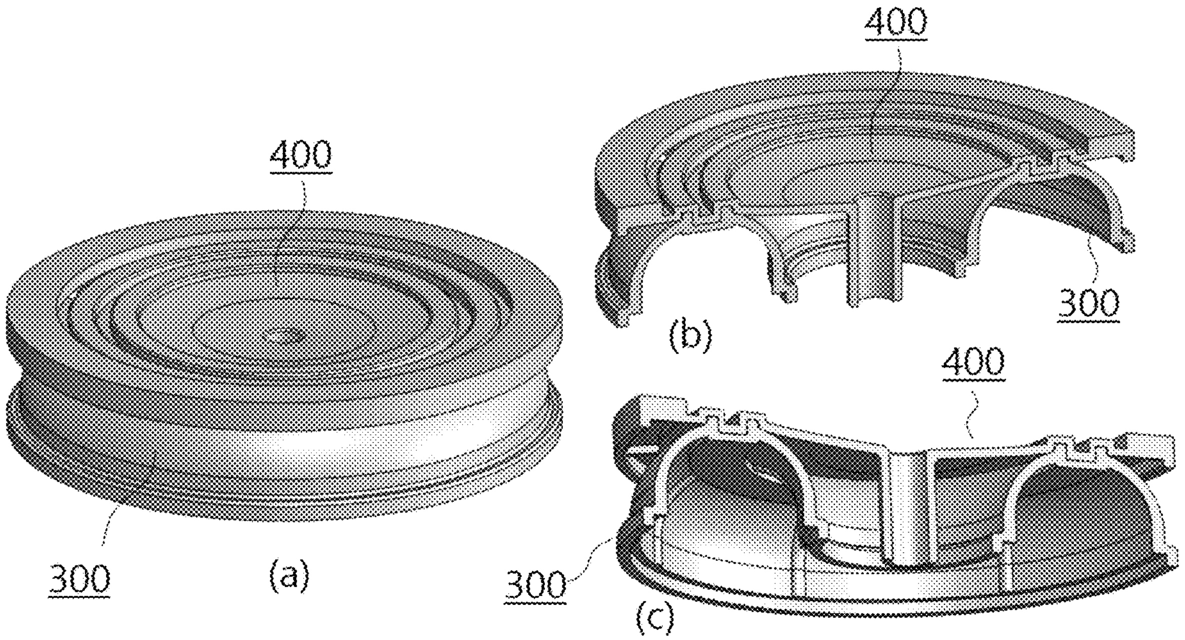

【Fig. 11】
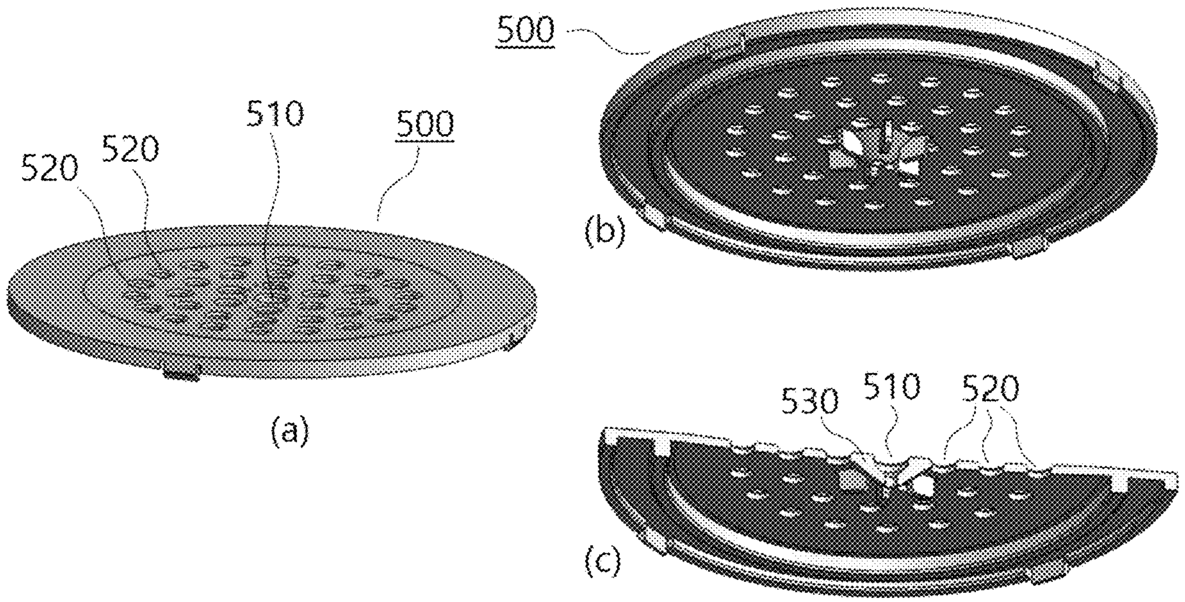

【Fig. 12】
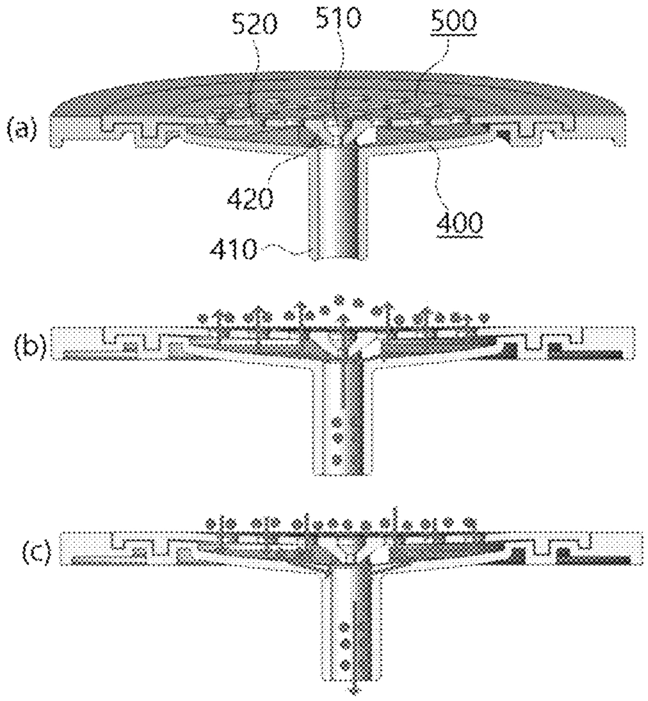

【Fig. 13】
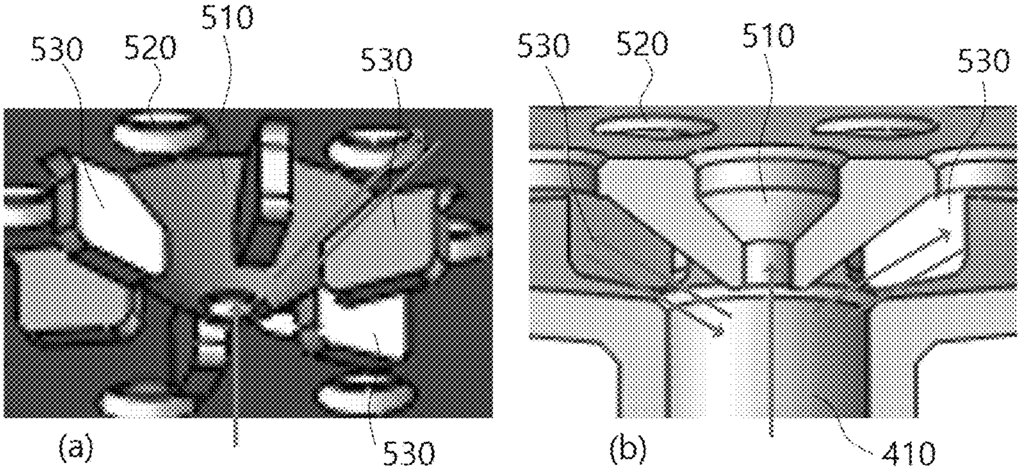

COSMETIC CONTAINER FOR POWDER HAVING PUMPING STRUCTURE

TECHNICAL FIELD

The present invention relates to a cosmetic container for powder. More particularly, the present invention relates to a cosmetic container for powder having a pumping structure.

BACKGROUND ART

In a conventional cosmetic container in which a powder material is accommodated, the powder is applied to a touch member by coming into contact with and rubbing an accommodation portion containing the powder with the touch member made of a sponge or puff, as disclosed in Korean Patent Application Publication No. 10-2017-0138836.

A user's skin is touched with the touch member to which powder is applied, and then the touch member is brought into contact with the accommodation portion in order to additionally apply powder to the touch member.

In this process, a problem arises in that sweat, water, other cosmetics, etc. on the skin contaminate the touch member and the contaminated touch member, in turn, contaminates the powder material accommodated in the accommodation portion.

Furthermore, especially in the case of a fine powder, a user applies force to the touch member, so that a problem arises in that the powder is not evenly applied to the touch member and is thus unevenly applied to the touch member.

DISCLOSURE

Technical Problem

A cosmetic container for powder having a pumping structure according to the present invention has the following objects:

First, the cosmetic container is intended to minimize the contamination of an accommodated powder material by a touch member contaminated by sweat, etc. on the skin.

Second, the cosmetic container is intended to allow a powder material to be uniformly applied to a touch member.

The objects of the present invention are not limited to those mentioned above, and other objects that are not mentioned will be clearly understood by those skilled in the art from the following description.

Technical Solution

The present invention provides a cosmetic container for powder having a pumping structure, the cosmetic container including: an accommodation portion configured to accommodate a powder material; a lower support portion disposed over the accommodation portion, and configured to allow air to be introduced such that the powder material accommodated in the accommodation portion is discharged together with the introduced air; an air pumping portion disposed over the lower support portion, and configured to pump air so that the air is introduced into the lower support portion; an intermediate support portion disposed over the air pumping portion, and configured to discharge a powder material together with air and to collect a remaining powder material; and a powder discharge portion spaced apart upward from the intermediate support portion, and configured to allow the discharged powder material to be collected.

In the present invention, the lower support portion may be configured such that a powder discharge hole is formed on one side thereof and a plurality of air inlet portions is formed on the other side thereof.

In the present invention, the lower support portion may be configured such that a powder discharge hole is formed at the center thereof and arc-shaped air inlet portions are formed along the edge thereof.

In the present invention, the arc-shaped air inlet portions may be provided with inclined portions so that air is introduced while being rotated in an inclined direction.

In the present invention, the air pumping portion may be configured such that a through hole communicating with the powder discharge hole is provided therein, an arch space portion communicating with the inlet portion is provided in a ring shape therein and the air pumping portion is made of a contractible flexible material so that as the arch space portion is contracted by pressure, the air pumping portion pumps air into the inlet portions.

In the present invention, the intermediate support portion may be configured such that a passage column portion communicating with the through hole is provided therein and a plane-shaped powder collection portion is formed to extend laterally over the passage column portion.

In the present invention, the powder collection portion may be provided to be inclined downward so that a powder material placed on the powder collection portion is moved to the passage column portion.

In the present invention, the powder discharge portion may have a flat plate shape, and may be provided with a powder discharge passage portion communicating with a passage column portion and also provided with a plurality of powder collection holes in the flat plate thereof.

In the present invention, the powder discharge passage portion may be provided in an upward-widening passage structure under the flat plate.

In the present invention, a plurality of protruding supports may be provided outside the powder discharge passage portion, and may allow the intermediate support portion and the powder discharge portion to be spaced apart from each other.

In the present invention, the plurality of supports may be spaced apart from each other so that a powder material in the passage column portion is discharged or introduced again between the supports.

In the present invention, a touch member may be provided over the powder discharge portion so that when the touch member is pressed, the air pumping portion performs pumping.

In the present invention, a cover may be further provided over the touch member.

Advantageous Effects

The cosmetic container for powder having a pumping structure according to the present invention has the following effects:

First, the pumping structure is provided, so that a powder material is discharged together with air, thereby providing the effect of preventing the touch member from coming into direct contact with the accommodation portion.

Second, the touch member does come into direct contact with the accommodation portion, thereby providing the effect of preventing a powder material from being contaminated with the touch member.

Third, a powder material is discharged together with air by the pumping structure, thereby providing the effect of allowing the powder material to be evenly applied to the touch member.

The effects of the present invention are not limited to those mentioned above, and other effects that are not mentioned will be clearly understood by those skilled in the art from the following description.

DESCRIPTION OF DRAWINGS

FIG. 1*a* shows the appearance of an assembled cosmetic container (10) according to the present invention, and FIG. 1*b* shows a state in which a touch member (600) is disposed with a cover (700) opened;

FIG. 2 is a longitudinal sectional view of the portion of FIG. 1B exclusive of a cover;

FIG. 3 is a longitudinal sectional view of the portion of FIG. 2 exclusive of a touch member;

FIG. 4*a* is a perspective view of an accommodation portion (100) according to the present invention, and FIG. 4*b* is a longitudinal sectional view of FIG. 4*a;*

FIG. 5*a* is a perspective view of a lower support portion (200) according to the present invention, and FIG. 5*b* is a longitudinal sectional view of FIG. 5*a;*

FIG. 6 is a longitudinal cross-sectional view of a state in which the accommodation portion (100) and the lower support portion (200) according to the present invention are coupled to each other;

FIG. 7*a* is a perspective view of an air pumping portion (300) according to the present invention, and FIGS. 7*b* and 7*c* are longitudinal sectional views of FIG. 7*a;*

FIGS. 8*a* and 8*b* are longitudinal sectional views of a state in which the lower support portion (200) and the air pumping portion (300) according to the present invention are coupled to each other.

FIG. 9*a* is a perspective view of an intermediate support portion (400) according to the present invention, and FIGS. 9*b* and 9*c* are longitudinal sectional views of FIG. 9*a;*

FIG. 10*a* is a perspective view of a state in which the air pumping portion (300) and the intermediate support portion (400) according to the present invention are coupled to each other, and FIGS. 10*b* and 10*c* are longitudinal sectional views of FIG. 10*a;*

FIG. 11*a* is a perspective view of a powder discharge portion (500) according to the present invention, and FIGS. 11*b* and 11*c* are longitudinal sectional views of FIG. 11*a;*

FIG. 12*a* is a longitudinal sectional view of a state in which the intermediate support portion (400) and the powder discharge portion (500) according to the present invention are coupled to each other, FIG. 12*b* shows a state in which a powder material is discharged in FIG. 12*a*, and FIG. 12*c* is a state in which a powder material is introduced again in FIG. 12*a*; and FIGS. 13*a* and 13*b* show a powder discharge passage portion (510), powder collection holes (520), and supports (530) according to the present invention.

10: cosmetic container
100: accommodation portion
200: lower support portion
210: powder discharge hole
220: air inlet portion
221: inclined portion
300: air pumping portion
310: through hole
320: arch space portion
400: intermediate support portion
410: passage column portion
420: powder collection portion
500: powder discharge portion
510: powder discharge passage portion
520: powder collection hole
530: support
600: touch member
700: cover

BEST MODE

The present invention provides a cosmetic container for powder having a pumping structure, the cosmetic container including: an accommodation portion configured to accommodate a powder material; a lower support portion disposed over the accommodation portion, and configured to allow air to be introduced such that the powder material accommodated in the accommodation portion is discharged together with the introduced air; an air pumping portion disposed over the lower support portion, and configured to pump air so that the air is introduced into the lower support portion; an intermediate support portion disposed over the air pumping portion, and configured to discharge a powder material together with air and to collect a remaining powder material; and a powder discharge portion spaced apart upward from the intermediate support portion, and configured to allow the discharged powder material to be collected.

MODE FOR INVENTION

Embodiments of the present invention will be described with reference to the accompanying drawings below so that those having ordinary skill in the art to which the present invention pertains can easily practice the present invention. As those having ordinary skill in the art to which the present invention pertains can readily understand, the embodiments described below may be modified in various forms without departing from the concept and scope of the present invention. The same or similar parts are denoted by the same reference symbols throughout the drawings as much as possible.

The technical terms used herein are used merely to illustrate specific embodiments and are not intended to limit the invention. The singular forms used herein include plural forms unless the phrases clearly indicate the opposite.

The term "include" used herein is intended to specify specific features, regions, integers, steps, operations, elements and/or components, but is not intended to exclude the presence or addition of one or more other features, regions, integers, steps, operations, elements, components and/or groups thereof.

All the teams including the technical teams and the scientific terms used herein have the same meanings as generally understood by those having ordinary skill in the art to which the present invention pertains. The terms defined in dictionaries are additionally interpreted as having meanings consistent with the related technical literature and the presently disclosed content, and are not interpreted as having ideal or very formal meanings unless defined.

The present invention will be described with reference to the drawings below. For reference, the drawings may be partially exaggerated to describe the features of the present invention. In this case, it is preferable to be interpreted in light of the overall purport of the present specification.

FIG. 2 is a longitudinal sectional view of the portion of FIG. 1B exclusive of a cover. FIG. 3 is a longitudinal sectional view of the portion of FIG. 2 exclusive of a touch member.

As shown in FIGS. 2 and 3, a cosmetic container for powder having a pumping structure according to the present invention includes an accommodation portion 100, a lower support portion 200, an air pumping portion 300, an intermediate support portion 400, and a powder discharge portion 500.

The accommodation portion 100 according to the present invention may have a general structure with a hollow, and may accommodate a powder material.

The lower support portion 200 according to the present invention may be disposed over the accommodation portion 100, and may allow air to be introduced such that the powder material accommodated in the accommodation portion 100 is discharged together with the introduced air.

The air pumping portion 300 according to the present invention may be disposed over the lower support portion part 200, and may pump air so that the air is introduced into the lower support portion 200.

The intermediate support portion 400 according to the present invention may be disposed over the air pumping portion 300, and may discharge a powder material together with air and collect the powder material remaining after the discharge.

The powder discharge portion 500 according to the present invention may be spaced apart upward from the intermediate support portion 400, and may allow the discharged powder material to be collected.

In the cosmetic container for powder having a pumping structure according to the present invention, as shown in FIG. 3, air is lowered and introduced into the accommodation portion 100 by the pumping of the air pumping portion 300, and the air inside the accommodation portion 100 is discharged through the intermediate support portion part 400 when air is continuously introduced by pumping. Since the accommodated powder is a fine powder, it is discharged together with air.

FIG. 5*a* is a perspective view of the lower support portion 200 according to the present invention, and FIG. 5*b* is a longitudinal sectional view of FIG. 5*a*. FIG. 6 is a longitudinal cross-sectional view of a state in which the accommodation portion 100 and the lower support portion 200 according to the present invention are coupled to each other.

The lower support portion 200 according to the present invention may be configured such that a powder discharge hole 210 is formed on one side thereof and a plurality of air inlet portions 220 is formed on the other side thereof.

The air inlet portions 220 according to the present invention may be provided in various structures and shapes (not shown) such as through holes (holes), elongated grooves, and grating pattern grooves.

Furthermore, as shown in FIG. 5, the lower support portion 200 may be configured such that a powder discharge hole 210 is formed at the center thereof and arc-shaped air inlet portions 220 are formed along the edge thereof.

In the present invention, the arc-shaped air inlet portions 220 may be provided with inclined portions 221 (see FIG. 5*b*), and thus air may be introduced while being rotated in an inclined direction by the inclined portions 221 (see FIG. 6). When the fine powder is slightly agglomerated, it may be crushed by the air pressure of the rotationally introduced air, and the discharged air flow may be formed more powerfully.

FIG. 7*a* is a perspective view of the air pumping portion 300 according to the present invention, and FIGS. 7*b* and 7*c* are longitudinal sectional views of FIG. 7*a*. FIGS. 8*a* and 8*b* are longitudinal sectional views of a state in which the lower support portion 200 and the air pumping portion 300 according to the present invention are coupled to each other.

The air pumping portion 300 according to the present invention may be configured such that a through hole 310 communicating with the powder discharge hole 210 is provided therein, an arch space portion 320 communicating with the inlet portion 220 is provided in a ring shape therein, and the air pumping portion is made of a contractible flexible material. As the arch space portion 320 is contracted by pressure, the air pumping portion 300 may pump air into the inlet portions 220.

For example, when the arch space portion 320 made of a rubber or silicone material is pressed, an arch space is pressed downward and thus the space is reduced. In this case, the air in the arch space portion 320 is moved downward, and will be moved to the accommodation portion 100 through the communicating air inlet portions 220 of the lower support portion 200.

When the pressure on the arch space portion 320 is released, the arch space portion returns to its original state, and air will fill the arch space portion again. Thereafter, when pressure pumping is performed again, the air in the arch space portion will be moved to the accommodation portion 100 through the air inlet portions 220 again.

Through this pumping process, the particles of the discharged powder collide with each other, and thus there may be achieved the effect in which the size of the discharged particles is made uniform.

FIG. 9*a* is a perspective view of the intermediate support portion 400 according to the present invention, and FIGS. 9*b* and 9*c* are longitudinal sectional views of FIG. 9*a*. FIG. 10*a* is a perspective view of a state in which the air pumping portion 300 and the intermediate support portion 400 according to the present invention are coupled to each other, and FIGS. 10*b* and 10*c* are longitudinal sectional views of FIG. 10*a*.

The intermediate support portion 400 according to the present invention may be configured such that a passage column portion 410 communicating with the through hole 310 is provided therein and a plane-shaped collection portion 420 is formed to extend laterally over the passage column portion 410. The passage column portion 410 functions to move the powder of the accommodation portion 100 to the powder discharge portion 500.

In the present invention, the collection portion 420 is provided to be inclined downward, and thus the powder material placed on the collection portion 420 is moved to the passage column portion 410.

FIG. 11*a* is a perspective view of the powder discharge portion 500 according to the present invention, and FIGS. 11*b* and 11*c* are longitudinal sectional views of FIG. 11*a*. FIG. 12*a* is a longitudinal sectional view of a state in which the intermediate support portion 400 and the powder discharge portion 500 according to the present invention are coupled to each other, FIG. 12*b* shows a state in which the powder material is discharged in FIG. 12*a*, and FIG. 12*c* is a state in which the powder material is introduced again in FIG. 12*a*. FIGS. 13*a* and 13*b* show a powder discharge passage portion 510, powder collection holes 520, and supports 530 according to the present invention.

The powder discharge portion 500 according to the present invention has a flat plate shape, and may be provided with the powder discharge passage portion 510 communicating with the passage column portion 410 and also provided with the plurality of powder collection holes 520 in the flat plate thereof.

In the process of performing pumping, air and powder may be discharged upward through the plurality of powder collection holes 520 (see FIG. 12*b*). It is obvious that some of the powder may be discharged and introduced during the pumping process by the discharge and inlet pressure of air.

In a state in which pumping is stopped, the air and powder already discharged through the plurality of powder collection holes 520 may fall downward (see FIG. 12*c*).

In the present invention, the powder discharge passage portion 510 may be provided in an upward-widening passage structure under the flat plate (see FIG. 13).

The discharged air and powder may be distributed more widely while passing through a passage from a narrow passage to an upper wide passage via this structure.

In the present invention, the plurality of protruding supports 530 may be provided outside the powder discharge passage portion 510, and may allow the intermediate support portion 400 and the powder discharge portion 500 to be spaced apart from each other.

The plurality of supports 530 may be spaced apart from each other, and thus the powder material in the passage column portion 410 may be discharged or introduced again between the supports 530 (see FIG. 13).

Meanwhile, in the present invention, a touch member 600 is provided over the powder discharge portion 500. When the touch member 600 is pressed, the air pumping portion 300 may perform pumping.

Furthermore, a cover 700 may be further provided over the touch member 600.

The embodiments described herein and the accompanying drawings are merely illustrative of some of the technical spirit included in the present invention. Therefore, the embodiments disclosed herein are not intended to limit the technical spirit of the present invention, but are intended to describe the technical spirit of the present invention. Accordingly, it will be apparent that the scope of the technical spirit of the present invention is not limited by these embodiments. All modifications and specific embodiments that may be easily inferred within the scope of the technical spirit included in the specification and accompanying drawings of the present invention by those skilled in the art should be interpreted as being included in the scope of the present invention.

The invention claimed is:

1. A cosmetic container for powder comprising:

an accommodation portion configured to accommodate a powder;

a lower support portion disposed over the accommodation portion, and having a plurality of air inlet portions and a powder discharge hole;

an air pumping portion disposed over the lower support portion and made of a contractible flexible material, the air pumping portion having a ring shape with a central through hole communicating with the powder discharge hole and the ring shape is defined by a concave arch having an arch space portion communicating with the air inlet portions, an intermediate support portion disposed over the air pumping portion, and a powder discharge portion upwardly spaced apart from the intermediate support portion, wherein during use, a downward force is applied to the powder discharge portion, causing the arch space portion to contract and air to move through the inlet portions and into the accommodation space, whereby powder and air are then discharged through the powder discharge hole, the intermediate support portion and the powder discharge portion, and the discharged powder collects on the powder discharge portion and the container permits a portion of the discharged powder to fall downwardly onto the intermediate support portion and back into the accommodation portion.

2. The cosmetic container of claim 1, wherein the powder discharge hole is formed on one side of the lower support portion and the plurality of air inlet portions are formed on another side of the lower support portion.

3. The cosmetic container of claim 2, wherein the powder discharge hole is formed at a center of the lower support portion and the plurality of air inlet portions are formed on along a peripheral edge of the lower support portion, and the plurality of air inlet portions have an arc-shape.

4. The cosmetic container of claim 3, wherein the plurality of air inlet portions are provided with inclined portions so that air is introduced while being rotated in an inclined direction.

5. The cosmetic container of claim 1, wherein the intermediate support portion is configured such that a passage column portion communicating with the through hole is provided therein and a plane-shaped powder collection portion is formed to extend laterally from the passage column portion.

6. The cosmetic container of claim 5, wherein the powder collection portion is inclined downward so that a powder material placed on the powder collection portion is moved to the passage column portion.

7. The cosmetic container of claim 1, wherein the powder discharge portion has a flat plate provided with a powder discharge passage portion and a plurality of powder collection holes, where the powder discharge passage portion communicates with a passage column portion of the intermediate support portion.

8. The cosmetic container of claim 7, wherein the powder discharge passage portion is provided in an upward-widening passage structure under the flat plate.

9. The cosmetic container of claim 8, wherein a plurality of protruding supports is provided outside the powder discharge passage portion, and allows the intermediate support portion and the powder discharge portion to be spaced apart from each other.

10. The cosmetic container of claim 9, wherein the plurality of supports are spaced apart from each other so that a powder material in the passage column portion is discharged or introduced again between the supports.

11. The cosmetic container of claim 1, wherein a touch member is provided over the powder discharge portion so that when the touch member is pressed, the air pumping portion performs pumping.

12. The cosmetic container of claim 11, wherein a cover is further provided over the touch member.

* * * * *